Oct. 25, 1966  J. W. LITTMAN  3,280,490
CONTINUOUS CHANGING DISPLAY DEVICE
Filed Jan. 9, 1964  3 Sheets-Sheet 1
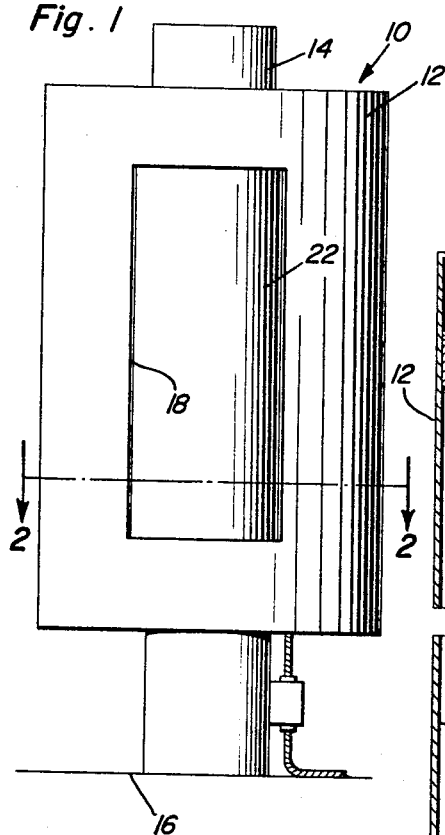
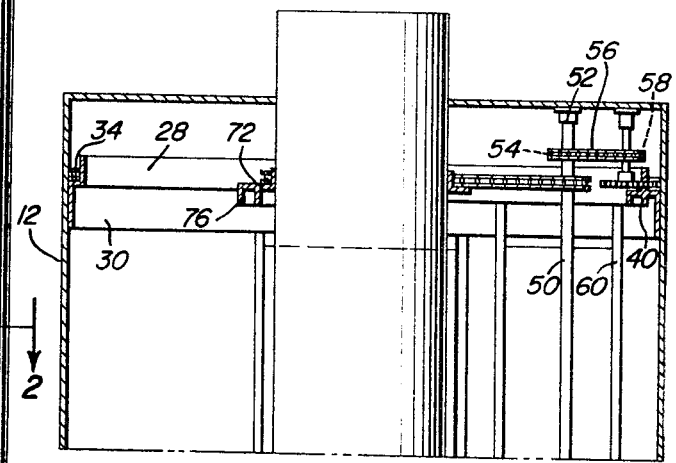
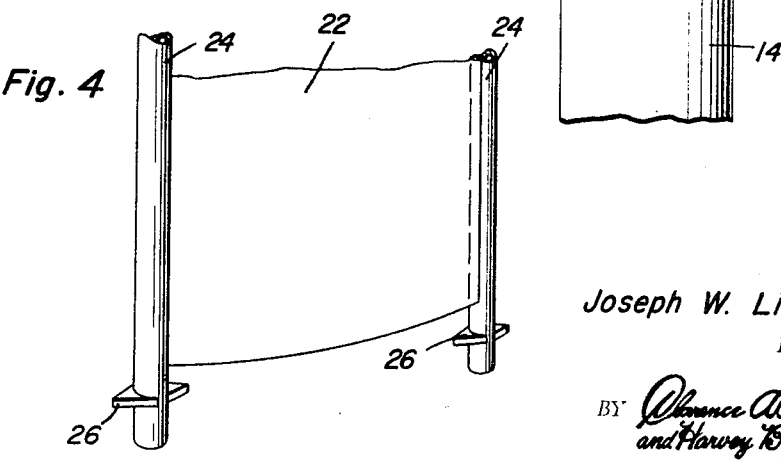
Joseph W. Littman
INVENTOR.

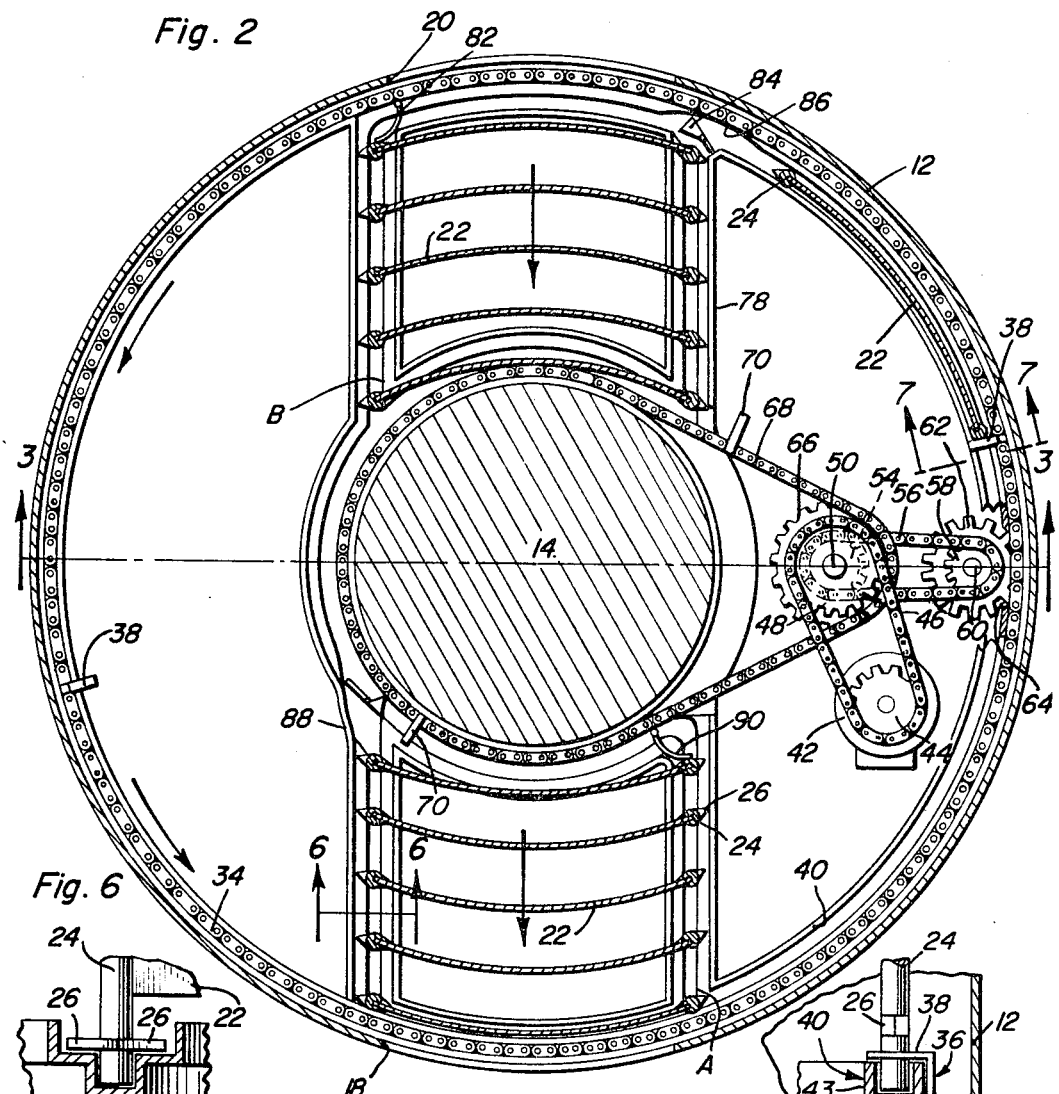
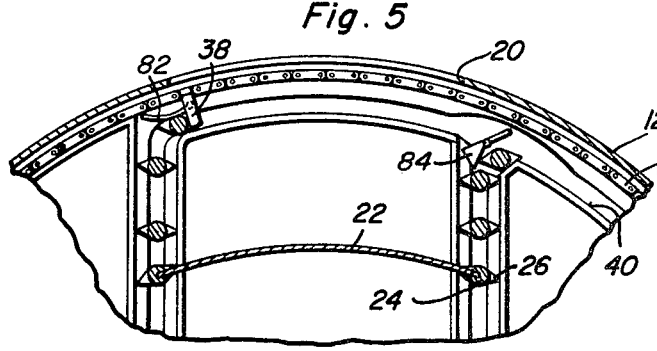

Oct. 25, 1966  J. W. LITTMAN  3,280,490
CONTINUOUS CHANGING DISPLAY DEVICE
Filed Jan. 9, 1964  3 Sheets-Sheet 3

EVERY OTHER TWO CARDS OMITTED TO SHOW CHANNELS

Joseph W. Littman
INVENTOR.

BY Clarence A. O'Brien
and Harvey B. Jacobson
Attorneys

United States Patent Office 3,280,490
Patented Oct. 25, 1966

3,280,490
CONTINUOUS CHANGING DISPLAY DEVICE
Joseph W. Littman, 1616 Salzedo St., Coral Gables, Fla.
Filed Jan. 9, 1964, Ser. No. 336,653
12 Claims. (Cl. 40—36)

The present invention generally relates to a display device and more particularly to a card display device in which the cards are movable within a housing for sequential viewing of the cards through a viewing area with the entire device being conveniently mounted on a central supporting structure or otherwise provided with a housing having a novel shape.

The primary object of the present invention is to provide a changeable card display device in which the cards are continuously changing with each card being viewed for a predetermined length of time and subsequently being moved by a conveying mechanism away from the viewing area into a remote relation thereto so that the cards will continue to circulate past the viewing area as the device operates.

Another object of the present invention is to provide a continuous card changing display device mounted on a supporting post or the like disposed centrally with there being viewing areas to the front and to the rear with the cards being sequentially carried past the viewing areas at the front and rear of the housing.

Yet another object of the present invention is to provide a card displaying device in accordance with the preceding objects in which the housing is generally cylindrical with the cards moving from the front to the rear around a portion of the periphery of the cylinder and then moving diametrically of the cylinder and peripherally around a portion of the post and then diametrically to the front viewing area with there being provided a novel arrangement of conveying chains, switch mechanisms and guide channels for so guiding the display cards which have a particular construction on the ends thereof for movement in the guide channels.

Still another important feature of the present invention is to provide a continuous card changing display device in the form of a bottle or other known apparatus or object in which the cards move diametrically towards the front viewing area, then peripherally to the rear viewing area with the diametric tracts including an outwardly bowed portion so that the flexible cards may change the direction of flexing thereof for conforming to both the front and rear periphery of the cylindrical housing.

Still a further important feature of the present invention is to provide a continuous card changing display device in which the cards move from a front viewing area around and into a transverse guide channel arrangement which maintains the cards in generally parallel relation to the front viewing surface area during the diametric movement of the cards.

Yet another important feature of the present invention is to provide a continuous and sequential card changing display device which is simple in construction, dependable, long lasting, easy to employ, adapted for use in various orientations and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the display device of the present invention illustrating the manner in which it is mounted on a supporting post;

FIGURE 2 is a transverse, plan sectional view, on an enlarged scale, taken substantially upon a plane passing along section line 2—2 of FIGURE 1 illustrating the details of construction of the mechanism for conveying the cards;

FIGURE 3 is a vertical, sectional view taken substantially upon a plane passing along section line 3—3 of FIGURE 2 illustrating further structural details of the operating mechanism;

FIGURE 4 is a partial perspective view of one of the cards illustrating the end structure for the side edge rails of the cards;

FIGURE 5 is a fragmental sectional view illustrating the switch mechanism for assuring that the cards enter the diametric guides in the proper manner;

FIGURE 6 is a detailed sectional view taken substantially upon a plane passing along section line 6—6 of FIGURE 2 illustrating the structural details of the channel shaped guide and the manner in which the side rails of the cards move therein;

FIGURE 7 is a detailed sectional view taken substantially upon a plane passing along section line 7—7 of FIGURE 2 illustrating the construction of the peripheral conveyor chains for the cards;

Figure 9:
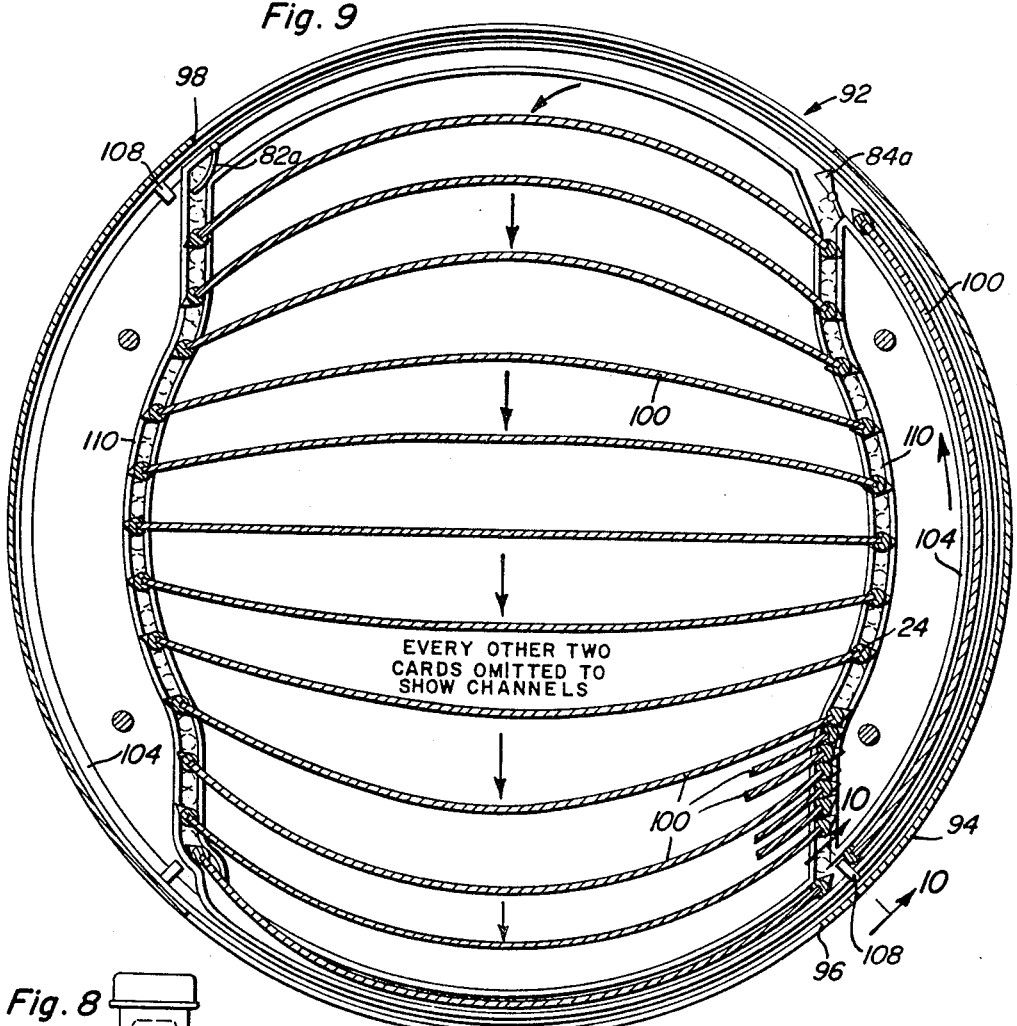
FIGURE 9 is a transverse, sectional view, on an enlarged scale, taken substantially upon a plane passing along section line 9—9 of FIGURE 8 illustrating the structural details of the form of the invention illustrated in FIGURE 8.

Referring now specifically to the drawings, the numeral 10 generally designates the form of the display device illustrated in FIGURES 1 through 7 and which includes generally cylindrical stationary hollow housing or casing 12 mounted in enclosing relation to a vertical supporting post 14 which is supported in a vertical manner from a supporting surface 16 and which includes a forward viewing area or enlarged opening 18 and a rear viewing area or enlarged opening 20, FIGURE 2, for revealing enlarged generally rectangular display cards 22 therethrough. The cards 22 are vertically elongated and each side edge thereof is provided with a rod 24 with each end of each rod 24 being provided with projecting triangular projections 26 on diametrically opposed sides of the rods 24 with the projections 26 generally being in alignment with the card 22. It will be noted from FIGURE 4 that these projections are in pairs and that each pair is located inwardly from the corresponding end of its rod.

Upper and lower circular parallel trackway rings 28 are fixed to the inner wall of housing 12, in respective planes normal to the axis of post 14. Referring particularly to FIGURES 2 and 7, lower ring 28 is conveniently formed as an integral one-piece item having a horizontally- and inwardly-directed flange 32 with wall 33 upstanding from its radially-inward edge to thus form a track and guide for its chain 34, so that the chain may freely move therein in guided rotation about the axis of post 14. Wall 33 has an inwardly directed horizontal flange 41 with wall 43 upstanding from its radially inward edge to thus form an arcuate track 40 within which the lower ends of rods 24 have a smooth sliding fit.

Upper ring 28 is similar in cross sectional form to the lower one described in the preceding paragraph, except that arcuate track 40 faces downwardly to receive the upper ends of rods 24, with a smooth sliding fit. FIGURE 2 shows that while the two tracks for chains 34 extend through 360° about the axis of post 14, the two tracks 40 extend only from a line normal to the plane of the figure just to the left of opening 18, counterclockwise, to a line normal to the plane of the figure and just to the left of opening 20. The length of rods 24 is coordinated with the spacing between tracks 40, measured parallel to the axis of post 14, such that each rod has its ends fitting within a respective track for smooth guided travel therein.

Lower chain 34 has two identical brackets 36 secured to links thereof at points diametrically opposed. The shape of these brackets, as shown in FIGURE 7, is such that a finger 38 integral therewith, extends radially across and travels just above the corresponding track 40 and is therefore positioned to sequentially engage a rod 24 and displace it in guided movement in, along and between tracks 40.

As clearly seen in FIGURE 3, the lowermost trackway 40 faces upwardly and the upper trackway 40 faces downwardly. The upper chain 34 does not have any fingers 38 thereon although the finger arrangement could be provided if desired.

A motor 42, FIGURE 2, is provided for driving the chains 34 and is provided with a sprocket drive gear 44 and a sprocket drive chain 46 engaged therewith. The drive chain 46 is engaged with a gear 48 carried by a vertically elongated shaft 50 journaled in bearings 52 in the end walls of the housing. The shaft 50 is provided with a pair of sprocket gears 54 receiving sprocket chains 56 thereover which are also engaged with sprocket gears 58 carried by a vertical shaft 60 disposed adjacent to the inner periphery of the housing 12 with the shaft 60 carrying a pair of sprocket gears 62 each of which is in meshing engagement with a respective one of the chains 34 through openings 64 in the wall 33 of annular ring 28 thereby providing for driving engagement with the chains 34 and causing the chains to be moved around the housing and the guides formed by the annular rings 28 in response to energization of motor 42.

The shaft 50 is also provided with a pair of sprocket gears 66 each receiving a respective one of two sprocket chains 68. Each chain has two projecting fingers 70 thereon. The two chains 68 encircle post 14 and fingers 70 are so fixed to respective links thereof that they alternately engage and shift through 180° about the axis of post 14, the radially inwardmost one of cards 22 moving inwardly from viewing opening 20. The upper guide 72 is provided with a downwardly opening channel shaped trackway 76 and the lower guide 74 is provided with an upwardly facing channel shaped guide or trackway 78 which has a widened upper end portion 80 for receiving the projections 26 of rods 24 for a portion of the periphery of the post 14 as illustrated in FIGURES 2 and 3. The trackways 76 and 78 extend diametrically of the housing 12 in spaced parallel relation and communicates with the trackways 40 at diametrically opposed points and generally in alignment with the viewing openings 18 and 20. Thus, as the cards move inwardly from the rear viewing area 20 towards the post 14, they will be engaged by the pin 70 and moved circumferentially around the post 14 in the trackways 78 and 80 and also in trackway 76 until they are disposed on the diametrically opposed side of the post 14 wherein they will move further diametrically outwardly for alignment behind the viewing area 18. It is pointed out that in the drawings, many of the cards 22 have been omitted for purposes of clarity. In other words, in the device as actually constructed and used, the cards are in substantially surface-to-surface contact within the parallel channels formed by trackways 76 and 78.

The entrance or throat between the trackway 40 and the portion of the trackways 78 in alignment with the rear opening 20 is provided with a pair of switch members 82 and 84 with the switch member 84 being disposed inwardly of the curved recess 86 in the annular ring 28. The switch member 84 is generally triangular shaped and is pivotally mounted so that as the leading rod 24 engages the upper surface, the rod 24 will ride over the upper surface of the switch 84 and pivot the uppermost edge thereof downwardly thus pivoting the edge facing the trackway 40 upwardly into the condition illustrated in FIGURE 5 whereby the trailing rod 24 of the sign 22 will be guided into and under the switch 84 wherein it will then engage the under cammed surface of the switch 84 and pivoted back to its position as illustrated in FIGURE 2. This orientation will ensure that only the leading side rail 24 will pass beyond the switch 84 and the trailing rod 24 will pass inwardly into the trackway 78. The switch 82 serves to cam the leading rod 24 into the curved trackway 78.

The exit from the post 14 to the diametrically extending trackway 78 is accomplished by a similar pair of switches 88 and 90. With this construction, the cards 22 are picked up by the fingers 38 and moved around the periphery of the housing and discharged into the diametrically extending trackways 78 and move radially inwardly until the fingers 70 pick up the card and move it circumferentially around the post 14 and then again into the diametric trackways 78 so that the card will then move into alignment with the viewing opening 18. The fingers 38 and the fingers 70 may be so timed to either pick up the trailing or the leading side edge rod either of which may be desirable depending upon the qualities and physical structure of the cards. With this arrangement, the same surface of the card will be viewed from the same opening and of course the various trackways may be detachably mounted for removing the trackways and guides for permitting replacement of the cards and other components as may be deemed necessary.

Figure 8:
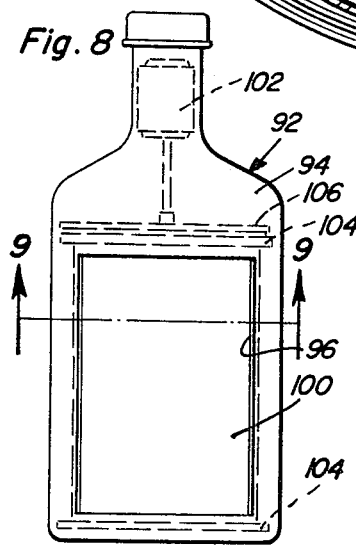
FIGURE 8 is a side elevational view illustrating a modified form of the invention in which the advertising display device is shaped in the form of a bottle.
Figure 10:
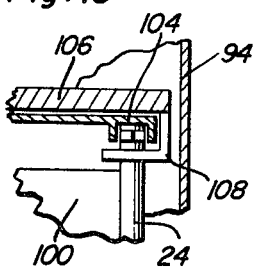
FIGURE 10 is a detailed sectional view taken substantially upon a plane passing along section line 10—10 of FIGURE 9 illustrating the details of construction of the conveying mechanism for the cards.

Reference numeral 92 generally designates the form of the invention illustrated in FIGURES 8–10 which includes a housing 94 generally simulating a bottle having an enlarged viewing opening 96 in the front and an enlarged viewing opening 98 in the rear and a plurality of enlarged movable cards 100 movable past the openings and driven by a concealed motor 102. The cards 100 are the same in construction as in connection with the device in FIGURES 1–7. The housing 94 is provided with annular guides 104 receiving the ends of the rods 24 with there being a plate 106 rotatable about the central vertical axis of housing 94 and spaced upwardly from top guides 104. The plate 106 including depending and inwardly extending fingers 108, FIGURE 10, is disposed in circumferentially spaced relation on the plate 106 for picking up the ends of rods 24 of the card 100 which is the same as the cards 22 in the other form of the invention. Extending diametrically of the housing 94 is a pair of trackways 110 having a centrally outwardly bowed portion which trackways are in communication with the guides 104 and which receive the cards 100 therefrom or at least receive ends of rods 24. As the cards 100 leave the rear viewing opening 98 they are convex in one direction and as they pass through the outwardly bowed portion 110, the cards will flex and will normally become bent concave in the other direction for conformance with the curvature of the housing 94. In this instance, also, a number of the cards and guide pins have been omitted for clarity.

As in the species of FIGURES 1 through 7, there is a switching device 84a, FIGURE 9, at the junction of guides 104 wtih right hand trackway 110, as the parts are viewed upon this figure. This device is essentially like member 84, FIGURES 2 and 5, in function and operation. That is to say, as the leading rod 24 of each card 100 traveling in and along guide 104, under urge of finger 108, engages the cam or wedge-shaped end of the switch lever in the pivotal position shown upon the figure, it acts in passing the switch, to pivot the lever counterclockwise so that the other end thereof lies in or obstructs the rearward end of guide 104. Then when the trailing rod 24 of the card contacts the switch lever, this rod is thereby diverted into the right hand trackway 110. In moving into the right hand trackway 110, the trailing rod engages the wedge-shaped end of lever 84a and cams it again into the position shown upon FIGURE 9, ready for the next card.

The leading rod of each card, as it engages switch spring or element 82a, is directed thereby into the left hand trackway 110 at about the same time that its trailing rod enters the right hand trackway, so that the two rods move along the respective trackways and, because of the shape thereof, in a manner clear from FIGURE 9, the cards are successively brought into a planar shape and then gradually flexed in the reverse direction as they approach viewing opening 96.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a continuously changing card display device, a display card comprising a rectangular flexible card adapted to carry indicia, elongated rods attached to and extending along opposed respective side edges of each card, the end edges thereof being free, one end of each said rod projecting beyond the corresponding end edge of its card and a triangular-shaped projection extending radially from the projecting end of each rod, each said projection forming cam means for guiding movement of the cards.

2. The structure as defined in claim 1 wherein said triangular shaped projection extends from the side of its rod diametrically opposite the card thereof, for controlling movement of the card in the display device.

3. In a display device, a housing, first and second spaced generally parallel tracks mounted in said housing in side-by-side relation, a third curved track having its ends intersecting said first and second tracks and coplanar therewith in a first plane, a display card having a first leading rod and a second trailing rod secured to and along its opposite edges, respectively, one end of each of said rods fitting said tracks for guided movement therealong, means operable to move said rods in spaced relation in and along said third track, switch means at the intersection of said second and third tracks for directing said first and leading rod in continued movement along said third track, toward said first track, said switch means being movable to direct said second and trailing rod into said second track substantially simultaneously with movement of said first rod into said first track.

4. The display device of claim 3, and means at the intersection of said first and third tracks directing said first rod from said third track into said first track.

5. The display device of claim 3, said switch means comprising a lever pivoted at the intersection of said second and third tracks and normally in position directing said first rod past said second track toward said first track, said lever being pivoted by movement of said first rod therepast, into a second position directing said second rod from said third track, into said second track.

6. The display device of claim 3, said housing having a first display opening adjacent said first and second tracks at one end thereof, and a second display opening adjacent said first and second tracks, at the other ends thereof, the rods of said display card moving simultaneously in and along said first and second tracks, respectively, to sequentially display the card through said first and second openings.

7. The device of claim 6, there being a plurality of said cards in and along said tracks, and power-operated means engaging and moving said cards in succession along said third track from said first and second tracks, at the ends thereof remote from said switch means and thence into said first and second tracks at their ends contiguous to said switch means.

8. The device of claim 6, said housing having a central axis normal to the plane of said first, second, and third tracks, a duplicate set of first, second, and third tracks in said housing, coplanar in a second plane spaced along said axis normal thereto, each said duplicate track forming a pair in parallel with the corresponding one of said first-included first, second, and third tracks, said first pair of tracks being centrally and arcuately outwardly bowed in one direction, each in its plane, said second pair of tracks being centrally and arcuately bowed in the opposite direction, each in its plane, the ends of the leading rod of said card having guided movement between and along said first and third pairs of tracks, the ends of the trailing rod of said card having guided movement between and along said second and third pairs of tracks.

9. The device of claim 8, there being a plurality of said cards each having the ends of its rods guided in succession by and along said pairs of tracks, as aforesaid.

10. The device of claim 9, a post disposed in said housing coaxial of said axis and said bowed portions, a first endless chain, means guiding said first chain in movement coaxially about said axis adjacent and parallel with said third tracks, a first abutment carried by said first chain and engaging said cards in succession as they appear at said first display opening, to move the same between and along said third pair of tracks, a second chain, means guiding said second chain about said post in parallel with the bowed portions of said first pair of tracks, a second abutment carried by said second chain, to engage and move each card with the ends of its rods moving in succession in and along the bowed portions of said first pair of tracks as said card approaches said post, and means at the other side of said post to direct the leading and trailing rods of each card into said second and first tracks, respectively, whereby each card presents the same face at said first and second openings, and means driving said chains in timed relation.

11. The device of claim 3, said housing having an axis midway between said first and second tracks and normal to the plane thereof, said first and second tracks being outwardly bowed at their central portions, arcuately about said axis, means operable to direct the leading rod of the card in and along said third and first tracks, and to direct the trailing rod of the card in and along said third and second tracks, and power driven means operable to engage a rod of the card and to move the same along said tracks, as aforesaid.

12. A display device comprising an enlarged hollow housing having a viewing opening, a plurality of cards mounted in the housing for registration in sequence with the viewing opening, each card having projecting rods carried by the ends thereof and forming, respectively, leading and trailing rods, a pair of trackways fixed within the housing and engaging the ends of the rods for guiding the same, means comprising first and second endless chain means, and first and second fingers each carried by a respective one of said chain means, for moving the cards sequentially into registration with the viewing opening, said trackways including an annular portion and first and second parallel, laterally spaced diametric portions, first and second switch means engaging and guiding each leading and trailing rod of each card from said annular trackway into said first and second diametric trackway portions, respectively, and means driving said chain means in predetermined timed relation.

References Cited by the Examiner

UNITED STATES PATENTS

| | | | |
|---|---|---|---|
| 539,135 | 5/1895 | Julien | 40—128 X |
| 981,167 | 1/1911 | Chick | 40—78 X |
| 1,024,177 | 4/1912 | Bradley | 40—36 |
| 1,322,175 | 11/1919 | Birdsall | 40—36 |
| 2,228,137 | 1/1941 | Hutchinson | 40—36 |
| 2,577,596 | 12/1951 | Wood | 40—36 |
| 2,770,899 | 11/1956 | Littman | 40—36 |
| 2,878,603 | 3/1959 | Heinz | 40—53 |

EUGENE R. CAPOZIO, *Primary Examiner.*

W. GRIEB, *Assistant Examiner.*